United States Patent
Stobba et al.

[11] Patent Number: 6,141,426
[45] Date of Patent: Oct. 31, 2000

[54] VOICE OPERATED SWITCH FOR USE IN HIGH NOISE ENVIRONMENTS

[75] Inventors: Laura Lynn Stobba, Schaumberg; William Edward Jacklin, Lombard, both of Ill.

[73] Assignee: Northrop Grumman Corporation, Los Angeles, Calif.

[21] Appl. No.: 09/079,649

[22] Filed: May 15, 1998

[51] Int. Cl.[7] .................................................... H03G 3/20
[52] U.S. Cl. ............................................................ 381/110
[58] Field of Search .................................. 704/233, 226, 704/231; 455/79; 381/110, 94.7, 123, 56, 122

[56] References Cited

U.S. PATENT DOCUMENTS

| | | |
|---|---|---|
| D. 265,402 | 7/1982 | Fukushima et al. . |
| D. 267,249 | 12/1982 | Fukushima et al. . |
| D. 298,242 | 10/1988 | Watanabe . |
| D. 309,136 | 7/1990 | Siddoway . |
| D. 339,128 | 9/1993 | Claxton et al. . |
| D. 368,711 | 4/1996 | Wicks et al. . |
| D. 378,678 | 4/1997 | Tyneski et al. . |
| D. 378,816 | 4/1997 | Hino . |
| D. 383,745 | 9/1997 | Lindeman et al. . |
| D. 384,059 | 9/1997 | Hockenberry et al. . |
| D. 385,269 | 10/1997 | Kim . |
| D. 385,270 | 10/1997 | Yahaya . |
| D. 393,260 | 4/1998 | Yahaya . |
| D. 393,638 | 4/1998 | Page et al. . |
| 3,916,312 | 10/1975 | Campbell . |
| 3,917,372 | 11/1975 | Selinko . |
| 4,025,721 | 5/1977 | Groupe et al. . |
| 4,031,468 | 6/1977 | Ziebell et al. . |
| 4,052,568 | 10/1977 | Jankowski . |
| 4,156,797 | 5/1979 | Hoole . |
| 4,227,258 | 10/1980 | Root et al. . |
| 4,277,645 | 7/1981 | May, Jr. . |
| 4,325,142 | 4/1982 | Nakazawa . |
| 4,374,301 | 2/1983 | Jrieder, Jr. . |
| 4,417,102 | 11/1983 | Allen . |
| 4,484,344 | 11/1984 | Mai et al. . |
| 4,621,373 | 11/1986 | Hodsdon . |
| 4,625,083 | 11/1986 | Poikela . |
| 4,627,107 | 12/1986 | Hohlfeld et al. . |
| 4,654,882 | 3/1987 | Ikeda . |
| 4,682,367 | 7/1987 | Childress et al. . |
| 4,734,049 | 3/1988 | George et al. . |
| 4,754,484 | 6/1988 | Larkin et al. . |
| 4,761,823 | 8/1988 | Fier . |
| 4,882,746 | 11/1989 | Shimada . |
| 4,903,325 | 2/1990 | Yoshitake et al. . |
| 4,905,272 | 2/1990 | Van de Mortel et al. . |
| 4,955,050 | 9/1990 | Yamauchi . |
| 4,993,065 | 2/1991 | Chiou . |
| 5,020,090 | 5/1991 | Morris . |
| 5,023,936 | 6/1991 | Szczutkowski et al. . |
| 5,038,400 | 8/1991 | Baracat et al. . |
| 5,081,641 | 1/1992 | Kotzin et al. . |
| 5,121,391 | 6/1992 | Paneth et al. . |
| 5,121,504 | 6/1992 | Toko . |
| 5,128,959 | 7/1992 | Bruckert . |
| 5,133,001 | 7/1992 | Bohm . |
| 5,140,628 | 8/1992 | Murata et al. . |
| 5,170,494 | 12/1992 | Levanto . |

(List continued on next page.)

*Primary Examiner*—Vivian Chang
*Attorney, Agent, or Firm*—Terry J. Anderson; Karl J. Hoch, Jr.

[57] ABSTRACT

A method for using a voice operated switch in a changing high noise environment involves determining a relative energy of the background noise, calculating VOX, voice, and delta thresholds, and comparing the VOX threshold to an amplitude of an incoming data sample. When the amplitude of the incoming data sample is greater than the VOX threshold, then the delta threshold is compared to the short-term average delta. When the amplitude of the short-term average delta is greater than delta threshold, then the voice threshold is compared to the short-term average. When the short term average is greater than the voice threshold, then the incoming data sample is determined to be voice and the voice operated switch is actuated.

17 Claims, 1 Drawing Sheet

U.S. PATENT DOCUMENTS

| | | |
|---|---|---|
| 5,189,358 | 2/1993 | Tomura et al. . |
| 5,191,593 | 3/1993 | McDonald et al. . |
| 5,193,217 | 3/1993 | Lunn et al. . |
| 5,230,016 | 7/1993 | Yasuda . |
| 5,230,080 | 7/1993 | Fabre et al. . |
| 5,247,567 | 9/1993 | Hirano . |
| 5,255,308 | 10/1993 | Hashimoto et al. . |
| 5,259,017 | 11/1993 | Langmantel . |
| 5,259,020 | 11/1993 | Hirano . |
| 5,261,121 | 11/1993 | Hashimoto . |
| 5,263,047 | 11/1993 | Kotzin et al. . |
| 5,265,150 | 11/1993 | Helmkamp et al. . |
| 5,274,634 | 12/1993 | Babiarz . |
| 5,276,680 | 1/1994 | Messenger . |
| 5,276,765 | 1/1994 | Freeman et al. . |
| 5,283,806 | 2/1994 | Dartois et al. . |
| 5,283,817 | 2/1994 | Hara et al. . |
| 5,293,588 | 3/1994 | Satoh et al. . |
| 5,297,142 | 3/1994 | Paggeot et al. . |
| 5,305,467 | 4/1994 | Herndon et al. . |
| 5,325,419 | 6/1994 | Connolly et al. . |
| 5,353,331 | 10/1994 | Emery et al. . |
| 5,365,572 | 11/1994 | Saegusa et al. . |
| 5,390,233 | 2/1995 | Jensen et al. . |
| 5,406,615 | 4/1995 | Miller, II et al. . |
| 5,408,496 | 4/1995 | Ritz et al. . |
| 5,410,632 | 4/1995 | Hong et al. . |
| 5,410,737 | 4/1995 | Jones . |
| 5,416,828 | 5/1995 | Hiramatsu et al. . |
| 5,440,613 | 8/1995 | Fuentes . |
| 5,442,659 | 8/1995 | Bauchot et al. . |
| 5,446,769 | 8/1995 | Shaver et al. . |
| 5,448,757 | 9/1995 | Hirata . |
| 5,459,814 | 10/1995 | Gupta et al. . |
| 5,465,401 | 11/1995 | Thompson . |
| 5,469,496 | 11/1995 | Emery et al. . |
| 5,471,503 | 11/1995 | Altmaier et al. . |
| 5,481,591 | 1/1996 | Suzuki . |
| 5,487,175 | 1/1996 | Bayley et al. . |
| 5,493,703 | 2/1996 | Yamashita . |
| 5,504,803 | 4/1996 | Yamada et al. . |
| 5,506,887 | 4/1996 | Emery et al. . |
| 5,509,053 | 4/1996 | Gowda et al. . |
| 5,509,406 | 4/1996 | Kock et al. . |
| 5,513,248 | 4/1996 | Evans et al. . |
| 5,519,763 | 5/1996 | Namekawa et al. . |
| 5,533,097 | 7/1996 | Crane et al. . |
| 5,555,448 | 9/1996 | Thiede et al. . |
| 5,568,536 | 10/1996 | Tiller et al. . |
| 5,574,775 | 11/1996 | Miller, II et al. . |
| 5,579,535 | 11/1996 | Orlen et al. . |
| 5,590,406 | 12/1996 | Bayley et al. . |
| 5,590,417 | 12/1996 | Rydbeck . |
| 5,594,777 | 1/1997 | Makkonen et al. . |
| 5,594,952 | 1/1997 | Virtuoso et al. . |
| 5,596,333 | 1/1997 | Bruckert . |
| 5,602,843 | 2/1997 | Gray . |
| 5,603,081 | 2/1997 | Raith et al. . |
| 5,606,560 | 2/1997 | Malek et al. . |
| 5,610,972 | 3/1997 | Emery et al. . |
| 5,619,493 | 4/1997 | Ritz et al. . |
| 5,619,553 | 4/1997 | Young et al. . |
| 5,625,673 | 4/1997 | Grewe et al. . |
| 5,625,877 | 4/1997 | Dunn et al. . |
| 5,633,911 | 5/1997 | Han et al. . |
| 5,640,689 | 6/1997 | Rossi . |
| 5,644,621 | 7/1997 | Yamashita et al. . |
| 5,649,055 | 7/1997 | Gupta et al. . |
| 5,657,375 | 8/1997 | Connolly et al. . |
| 5,657,422 | 8/1997 | Janiszewski et al. . |
| 5,659,594 | 8/1997 | Toda . |
| 5,659,882 | 8/1997 | Fukutomi . |
| 5,659,890 | 8/1997 | Hidaka . |
| 5,664,005 | 9/1997 | Emery et al. . |
| 5,675,629 | 10/1997 | Raffel et al. . |
| 5,774,793 | 6/1998 | Cooper et al. . |

VOICE OPERATED SWITCH FOR USE IN HIGH NOISE ENVIRONMENTS

FIELD OF THE INVENTION

The present invention relates generally to voice operated switches and more particularly to an adaptive voice operated switch (VOX) algorithm which works effectively in changing high noise environments and which requires only a small amount of processing power.

BACKGROUND OF THE INVENTION

Voice operated switches for activating the transmission or record mode of operation on headsets, walkie talkies, two way radios, tape recorders, and the like are well known.

Such voice operated switches function by measuring the output of a microphone and only providing that output to amplification circuitry when the output exceeds a predetermined threshold level. Thus, ideally, transmission only takes place when the speaker is talking. Such operation is particularly useful in half-duplex systems, wherein a transmission can only be received when the listener is not talking.

The use of a voice operated switch (VOX) also mitigates power consumption, since the transmitter is not turned on all of the time. It may also reduce stress upon anyone listening to the transmission, since ambient noise is not transmitted when the person operating the transmitter is not speaking (at least in ideal situations). Voice operated switches are also useful when it is difficult or undesirable to manually actuate a transmitter, such as by pushing a microphone button. This may be the case when the user's hands are otherwise occupied. A tank driver, for example, must frequently use both hands to control the tank.

However, one problem commonly associated with voice operated switches is that they are susceptible to being inadvertently actuated by high ambient noise levels. As those skilled in the art will appreciate, high ambient noise levels frequently result in undesirable triggering of the voice operated switch, thereby causing the transmit channel to remain open when the speaker is not actually talking. Of course, holding the transmit channel open on a high noise environment results in the transmission of the noise to the receiver. It can be very annoying for the a listener at the receiver to listen to such noise and may, in fact be dangerous if it distracts the listener, in some instances.

Although the sensitivity of such voice operated switches may be varied, so as to mitigate undesirable triggering by high ambient noise, such changing of the threshold inherently makes it more difficult for the user to trigger the voice operated switch by talking. That is, the user must talk at a higher level in order to trigger a less sensitive voice operated switch, particularly for switches such as this one, which relies primarily on energy level as opposed to spectral components. This may be undesirable since it may not be natural, and is easy to forget, thereby resulting in non-transmitted communications. It also may be uncomfortable for the user to talk at such a higher level. Talking at a higher level for an extended length of time may result in hoarseness or fatigue, or even a temporary loss of voice.

Most contemporary voice operated switch algorithms are designed specifically for low noise environments, where a large increase in overall signal power is actually a very reliable indicator of the presence of the speakers voice. Although algorithms which are specifically designed for high noise environments are known, such high noise voice operated switch algorithms typically employ Fast Fourier Transforms (FFT) or floating-point digital filters, both of which require a significant amount of processing power.

A particular problem with voice operated switches occurs when the ambient noise level is frequently changing and is sometimes very high. In these instances, it is not practical to continually readjust the sensitivity of the microphone trigger circuit. Thus, it is desirable to provide an adaptive voice operated switch algorithm which works effectively in changing high noise environments, particularly wherein the algorithm does not require excessive processing power.

SUMMARY OF THE INVENTION

The present invention specifically addresses and alleviates the above mentioned deficiencies associated with the prior art. More particularly, the present invention comprises an adaptive voice operated switch algorithm which works effectively in changing high noise environments and which requires only a small amount of processing power such that a low power and inexpensive device is provided.

According to the preferred embodiment of the present invention, the voice operated switch algorithm utilizes a TI-TMS320C2xx DSP chip, which, as those skilled in the art will appreciate, is primarily designed for integer calculations (as opposed to floating point calculations). However, many other DSP chips, as well as general purpose computational devices, may be suitable.

The voice operated switch algorithm of the present invention assumes that the desired voice signal will contain more energy than the background noise. This is based upon the expectation that, regardless of the noise level, the speaker will always speak loud enough to hear his own voice over the noise.

The voice operated switch algorithm of the present invention is also based upon the assumption that the incoming audio signal is linear. Thus, if A-Law or $\mu$-law compression is utilized, then the data is expected to be uncompressed prior to beginning the voice operated switch algorithm. More particularly, the present invention comprises a method for using a voice operated switch in changing high noise environments, wherein the method comprises the steps of determining a relative energy of background noise by calculating a long-term average, a short-term average, and a short term difference of the background noise. Calculating the short term average comprises summing an absolute value of a plurality of samples of audio data and applying a smoothing algorithm thereto. Various smoothing algorithms, well known to those skilled in the art, are suitable. Calculating the long-term average comprises summing a plurality of short term averages. Calculating the short-term difference comprises computing a difference between consecutive short term averages.

The method for using a voice operated switch in changing high noise environments further comprises the steps of calculating a VOX threshold, calculating a voice threshold, and calculating a delta threshold. The VOX threshold is compared to an amplitude of an incoming data sample. When the amplitude of the incoming data sample is greater than the VOX threshold, then the delta threshold is compared to the short-term average delta. When the amplitude of one or more short-term average deltas are greater than the delta threshold, then the voice threshold is compared to the short term average. When the short term average is greater than the voice threshold, or, alternatively, a preset number of short-term deltas are greater than the delta threshold within a preset period of time, then the incoming data sample is determined to be voice, and the voice operated switch is actuated.

The step of applying smoothing algorithm preferably comprises low pass filtering of the audio data. Those skilled in the art will appreciate that various different algorithms for digitally low pass filtering audio data are suitable.

The step of determining a relative energy of background noise using a long-term average of the background noise preferably comprises using a long-term average comprised of 512 audio data samples. Each audio data sample preferably has a length of approximately 0.064 seconds and sampling is preferably performed at the sample rate of approximately 8 kHz. Those skilled in the art will appreciate that various other numbers of audio data samples and various other sample lengths, as well as various other sample rates, are likewise suitable.

The step of determining a relative energy of background noise using a long-term average preferably comprises summing short-term averages for approximately 16 seconds. Those skilled in the art will appreciate that various other lengths of time are likewise suitable.

The step of determining a relative energy of background noise using a short-term difference of the background noise preferably comprises determining a relative energy of background noise using a slope of the short-term averages which is representative of how fast the audio signal is changing. This may accomplished by calculating a first derivative of a best fit curve which is generated utilizing the sample data points.

The steps of calculating a VOX threshold, calculating a voice threshold, and calculating a delta threshold are preferably preformed each time that the long-term average is calculated.

The steps of calculating a VOX threshold, calculating a voice threshold, and calculating a delta threshold are preferably only performed only when a voice is not present in the audio signal. Optionally, data for the long term average may continue to be collected when a voice is present in the audio signal. Preferably, the collection of samples for the long term average is discontinued after a voice has been present in the sample for more than a predetermined period of time.

The step of comparing the VOX threshold to an amplitude of an incoming data sample preferably comprises comparing a VOX threshold, which is a predetermined amount greater than the ambient noise, to the amplitude of the incoming data sample.

The step of comparing the VOX threshold to an amplitude of an incoming data sample preferably comprises comparing a VOX threshold which is a multiple of the long-term average to the incoming data sample. Preferably, the VOX threshold is approximately equal to the maximum ambient noise amplitude.

The delta threshold is preferably approximately equal to the long term average. The voice threshold is preferably approximately 1.5 times the long-time average.

According to one preferred embodiment of the present invention, the VOX threshold is approximately equal to six times the long-term average, the voice threshold is approximately equal to the VOX threshold right-shifted by two bits, and the delta threshold is approximately equal to the long-term average.

The long term average is calculated by summing 256 short term averages and right shifting the sum by 8 bits. Similarly, the short term average is calculated by summing the absolute value of 512 input samples and right-shifting the sum by 9 bits.

Alternatively, the long term average is calculated by summing 256 short-term averages which have been right-shifted by four bits prior to summing, then right shifting the final sum by four additional bits to prevent overflow in a 16-bit processor.

Similarly, the short-term average may be calculated by summing the absolute value of 512 input samples which have been right-shifted by five bits prior to summing, then right shifting the final sum by four additional bits to prevent overflow in a 16-bit processor.

Since a 16-bit processor was used, it was not possible to sum 512 input values without overflow, since the input values (as uncompressed $\mu$-law data) have a maximum amplitude of 12 bits. Thus, the absolute value of each input sample was right-shifted by 5 bits prior to summing, and the final sum was right-shifted 4 more bits to create the final 12-bit short-term average. Similarly, since the maximum short-term average could be 12 bits in magnitude, it was not possible to sum 256 of these values without overflow in a 16-bit processor. Thus, each short term average was shifted right by four bits prior to summing, and the final sum was right-shifted by four more bits to create the final 12-bit long term average. This technique prevents any overflow of the processor while calculating these averages.

This technique also causes the loss of some resolution. Since only the least significant bits are lost, this loss of resolution is negligible in high-noise (and thus high signal amplitude) environments; however, a requirement of this algorithm is that it must perform acceptably in both high and low noise environments, for this reason, a lower limit on the thresholds is imposed. For example, for this application it was found experimentally that long-term averages less than 100 resulted in poor performance of the VOX. Therefore any time a long-term average is lower than 100, it is reset to 100 prior to the calculation of the thresholds.

Per the specific application of the VOX, and upper limit may also be imposed on the long-term average. For example, in this application of the VOX the maximum amplitude of the incoming data is 12 bits. If the long-term average is so large that the resulting VOX or VOICE thresholds are greater than 12 bits, then the VOX will never activate. Thus, for long-term averages greater than some value, for example 680, the thresholds are reset to a permissible value, such as 3000 (which is less than the maximum 12 bit value of 4095). However, the DELTA threshold is still calculated normally.

According to the preferred embodiment of the present invention, the VOX threshold, the voice threshold, and the delta threshold are all initialized to the maximum allowed magnitude (4095 in this application).

Thus, according to the present invention a method for using a voice operated switch in changing high noise environments which consumes little processing power is provided.

These, as well as other advantages of the present invention will be more apparent from the following description and drawings. It is understood that the changes in the specific structure and methodology shown and described may be made within the scope of the claims without departing from the spirit of the invention.

DETAILED DESCRIPTION OF THE PREFERRED INVENTION

Figure 1:
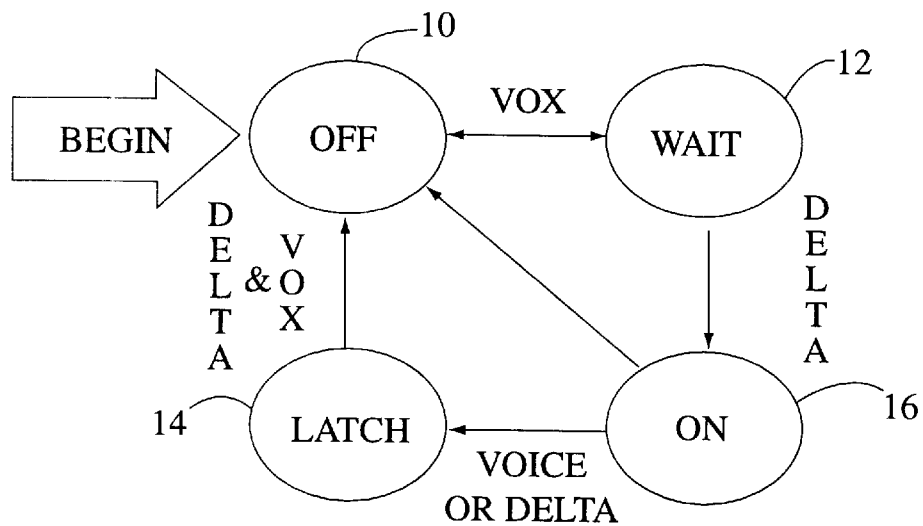
FIG. 1 is a block diagram of a state machine for operating a voice operated switch in high noise environments according to the methodology of the present invention.
Figure 2:
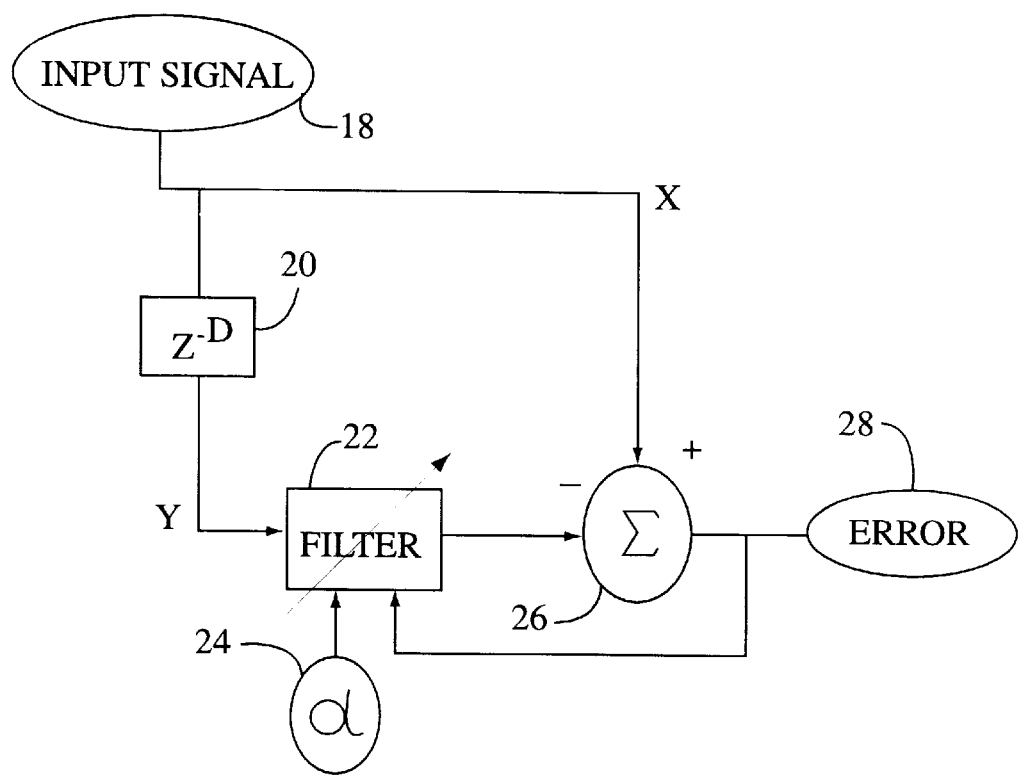
FIG. 2 is a block diagram of an adaptive filter for the voice operated switch of the present invention.

The detailed description set forth below in connection with the appended drawings is intended as a description of the presently preferred embodiment of the invention, and it is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention. The voice operated switch of the present invention is illustrated in FIGS. 1 and 2, which depict a presently preferred embodiment thereof.

The VOX algorithm of the present invention assumes that the speech signal will have more energy than the background noise. It is assumed that all intelligible voice will satisfy this expectation based on the assumption that regardless of noise level, the user will speak loud enough to hear himself/herself over the noise.

This algorithm expects the incoming audio data to be linear. If A-law or $\mu$-law compression is used, then the data must be decompressed prior to beginning the VOX algorithm.

The VOX determines the relative energy of the noise using three data elements: the long-term average (LTA), the short-term average (STA), and the short-term difference (STA-delta). The STA is the summation of the absolute value of several samples of incoming audio data, for example 512 samples (0.064 seconds at a sample rate of 8 kHz). The STA smooths out the signal, acting as a simple low-pass filter. The LTA is the summation of STA over a longer period (for example, 16 seconds), divided by the total number of STA. This value indicates the overall energy of the signal. The third value, the STA-delta, is the difference between consecutive STA values. This value indicates the slope of the STA, which is representative of how fast the signal energy is increasing or decreasing.

The VOX of the present invention utilizes three thresholds VOX, VOICE, and DELTA. These are preferably calculated every time an LTA is calculated (for example, every 16 seconds); however, threshold calculation may optionally be halted when voice is present to prevent the thresholds from becoming too high. The exact calculations of the thresholds vary depending on what type of background noise the system may be expected to encounter. Thresholds are defined and applied as follows.

The VOX threshold is compared to the magnitude of the individual incoming data samples; values greater than the threshold are suspected to be voice. Thus, it is desired to choose the VOX threshold to be well above the noise. The VOX threshold should be some multiple of the LTA. For example, this algorithm was developed for tank noise; the LTA of most tank noise samples appeared to be about ⅙ of the maximum noise magnitude in the tank. Thus, the VOX threshold for this situation is set at six times the LTA.

The DELTA threshold is compared to the STA-delta; values greater than the threshold are determined to be voice. The DELTA threshold represents jumps in energy. In most noise samples tested, the jumps in energy with no voice present were fairly low; for tank noise, the jumps were generally less than the overall energy of the signal; thus the DELTA threshold is equal to the LTA.

The VOICE threshold is compared to the STA; values greater than the threshold are suspected to be voice. When only noise is present, the STA can jump above and below the LTA over time, thus the VOICE threshold has to lie above the larger values of the noise signal's STAs. Thus, for tank noise, a VOICE signal of 1.5 times the LTA is used.

Note that since the processor used is designed for integer math, the averages given as examples can be calculated as follows:

VOX=6*LTA
VOICE=VOX right-shifted 2 bits
DELTA=LTA

Thus, the averages are calculated with one multiply and two shift operations.

The long term average is calculated by summing 256 short term averages and right shifting the sum by 8 bits. Similarly, the short term average is calculated by summing the absolute value of 512 input samples and right-shifting the sum by 9 bits.

Since a 16-bit processor was used, it was not possible to sum 512 input values without overflow, since the input values (as uncompressed $\mu$-law data) have a maximum amplitude of 12 bits. Thus, the absolute value of each input sample was right-shifted by 5 bits prior to summing, and the final sum was right-shifted 4 more bits to create the final 12-bit short-term average. Similarly, since the maximum short-term average could be 12 bits in magnitude, it was not possible to sum 256 of these values without overflow in a 16-bit processor. Thus, each short term average was shifted right by four bits prior to summing, and the final sum was right-shifted by four more bits to create the final 12-bit long term average. This technique prevents any overflow of the processor while calculating these averages.

This technique also causes the loss of some resolution. Since only the least significant bits are lost, this loss of resolution is negligible in high-noise (and thus high signal amplitude) environments; however, a requirement of this algorithm is that it must perform acceptably in both high and low noise environments. for this reason, a lower limit on the thresholds is imposed. For example, for this application it was found experimentally that long-term averages less than 100 resulted in poor performance of the VOX. Therefore any time a long-term average is lower than 100, it is reset to 100 prior to the calculation of the thresholds.

Per the specific application of the VOX, and upper limit may also be imposed on the long-term average. For example, in this application of the VOX the maximum amplitude of the incoming data is 12 bits. If the long-term average is so large that the resulting VOX or VOICE thresholds are greater than 12 bits, then the VOX will never activate. Thus, for long-term averages greater than some value, for example 680, the thresholds are reset to a permissible value, such as 3000 (which is less than the maximum 12 bit value of 4095). However, the DELTA threshold is still calculated normally.

Upon activation of the system, the thresholds are all set to the maximum value and the data elements are all set to 0. The VOX is specified to be in its OFF state until one second of data is collected. After one second, the LTA is calculated (based on the STAs calculated thus far) and a set of thresholds are calculated as specified above. Thus, the VOX cannot activate until at least one second has passed. This process is repeated again four seconds later after startup, using the data collected until that time. After 16 seconds, normal VOX operation continues, with thresholds calculated every 16 seconds.

Depending on the type of noise used, a one-second sample may not be sufficient data to represent the overall energy of the noise; in that case, there may be a greater rate of false alarms or missed detections until the 4-second thresholds are calculated. Thus, these times may be varied per the specific application of this algorithm.

Referring now to FIG. 1, the VOX algorithm has four states, OFF 10, WAIT 12, ON 16, and LATCH 14. The VOX is only transmitting in ON 16 and LATCH 14 states. A description of the states follows.

The VOX is in OFF 10 state when it is first activated. The VOX will remain in OFF 10 state until the magnitude of an incoming data sample exceeds the VOX threshold. At this point, the VOX switches to WAIT 12 state and starts a timer.

The VOX may not remain in WAIT 12 state for more than one second. During this second, the short-term differences are compared to the DELTA threshold. If a short-term difference exceeds the threshold, the VOX moves to ON 16 state. If the timer reaches one second and the threshold condition has not been satisfied, the VOX returns to OFF 10 state.

While in ON 16 state, the VOX is transmitting. The VOX may not remain in ON 16 state for more than one second.

During this time, the short-term averages are compared to the VOICE threshold. If the condition is satisfied, the VOX moves to LATCH state. If the timer reaches one second before this condition is satisfied, the VOX returns to OFF state.

Alternatively, it has also been found that another reliable method of moving from ON to LATCH state is to compare incoming short-term delta to the DELTA threshold. If a certain predetermined number of these short-term delta satisfy the DELTA threshold before the timer reaches one second, the VOX moves to LATCH state. Otherwise, it returns to OFF state. The current embodiment of the algorithm uses this second method of moving from ON to LATCH state, specifying that four short-term deltas must be greater than the DELTA threshold in order to move from ON to LATCH state.

While in the LATCH 14 state, the VOX is transmitting. The VOX may remain in LATCH 14 state indefinitely. To exit latch state, there must be a two second period during which the VOX and DELTA thresholds are not satisfied. This indicates that the signal power has lowered to the level of the noise, suggesting voice is no longer present. Upon exiting LATCH 14 state, the VOX returns to OFF state.

As shown in FIG. 1, the VOX of the present invention comprises a state machine. The arrow directions indicate which states are possible next states for this system, and the thresholds which allow transition from one state to the next are given.

Under perfect conditions, the VOX will never activate the moment a user begins to speak. At the very least, the time required to calculate a new STA-delta must pass before the VOX can switch from WAIT state to ON state and begin transmitting. This delay may clip the first few sounds transmitted, possibly a whole word. For this reason, a data buffer will be used. This buffer will hold at least one STA length worth of data (512 samples or 64 ms for the given application). When it is determined that voice is present, the VOX will output two signals. One signal will be delayed by the length of the buffer in order to transmit the entire data buffer plus the remainder of the signal until the VOX deactivates. This output is transmitted over the communications system so that none of the listeners will miss any of the message. The other output will be the actual, real-time signal and it will be sent without delay directly back to the speaker for purposes of local sidetone generation. This is done for two reasons: first, a delay greater than about 5 ms creates a distracting echo when the speaker hears the local sidetone; second, a clipped local sidetone signal will not affect meaning or intelligibility since the speaker knows what he/she said.

In the initial testing of the VOX, the algorithm performed best when the background noise was white gaussian noise. Since white Gaussian is the least like voice in the time domain, the VOX was capable of quickly and correctly detecting the presence of intelligible voice. However, tank noise is much more spectrally biased (i.e., colored) and the VOX would often produce a false alarm when only noise was present, or miss detection of voice due to the similarity between the voice and the noise. Since white gaussian noise is the most desirable, an adaptive spectral whitening filter was implemented, with very positive results.

Although the filter was added primarily to improve VOX performance, it was also found to cancel some of the noise at the output, providing a clearer voice signal to the listener. Thus, it may be desirable to use the output of the filter as the output of the VOX when voice is present. It has been noticed that the filter adapts itself to be roughly a high-pass filter for most signals. This suggests that high-frequency impulsive noise may not be effectively canceled, causing a false alarm. Also, the filter is not as effective when the noise is primarily in the same frequency bands as voice.

Referring now to FIG. 2, the adaptive filter of the present invention is implemented as shown. The filter attempts to reduce the error resulting from the difference between the input signal and the filtered signal. The update coefficient, $\alpha$, is chosen small enough such that the filter does not become unstable. The delay time, D, was experimentally found to be most effective when equal to 1 sample for the given application. Due to constraints in processing power, four taps were used. The coefficients were updated adaptively as follows:

$$\text{coeff}(i) = \text{coeff}(i) + \alpha * \text{error} * x(i-D)$$

The error is used as the filter output. It is beneficial to halt the adaptation of the coefficients when voice is present by using the last set of coefficients calculated prior to the detection of voice. This prevents the filter from attempting to cancel the voice signal as well.

The elements are implemented in the following order:

A. Apply adaptive filter to incoming data sample.

B. Use filter output to calculate data elements.

C. Calculate thresholds, if necessary.

D. Determine what state the VOX is currently in.

E. Determine if the VOX must change states.

F. Return either original signal (for states ON 16 and LATCH 14) or zero (for states WAIT 12 and OFF 10).

It is understood that the exemplary voice operated switch described herein and shown in the drawings represents only a presently preferred embodiment of the invention. Indeed, various modifications and additions may be made to such embodiment without departing from the spirit and scope of the invention. For example, those skilled in the art will appreciate that various other DSP chips than the TI TMS320C2xx DSP chip are likewise suitable. Indeed, other means of performing the digital signal processing functions may be suitable, rather than using a DSP chip at all. This may be particularly true as the processing speed of general purpose microprocessors increases to the point where they can do elaborate integer arithmetic rapidly. Further, discussion of the present invention as being used in a tank is by way of example only, and not by way of limitation. Those skilled in the art will appreciate that various other applications of the present invention exist. Thus, these and other modifications and additions may be obvious to those skilled in the art and may be implemented to adapt the present invention for use in a variety of different applications.

What is claimed is:

1. A method for using a voice operated switch in changing high noise environments, the method comprising the steps of:
    a) determining a relative energy of background noise by calculating a long-term average, a short-term average, and a short-term difference of the background noise, wherein:
        i) calculating the short-term average comprises summing an absolute value of a plurality of samples of audio data and applying a smoothing algorithm thereto;
        ii) calculating the long-term average comprises summing a plurality of short-term averages; and
        iii) calculating the short-term difference comprises computing a difference between consecutive short-term averages;
    b) calculating a VOX threshold;
    c) calculating a voice threshold;
    d) calculating a delta threshold;
    e) comparing the VOX threshold to an amplitude of an incoming data sample;
    f) when the amplitude of the incoming data sample is greater than the VOX threshold, then comparing the delta threshold to the short-term average delta;
    g) when the amplitude of the short-term average delta is greater than the delta threshold, then comparing the voice threshold to the short-term average; and
    h) when the short-term average is greater than the voice threshold, then the incoming data sample is determined to be voice and the voice operated switch is actuated.

2. The method for using a voice operated switch as recited in claim 1, wherein the step of applying a smoothing algorithm comprises low pass filtering the audio data.

3. The method for using a voice operated switch as recited in claim 1, wherein the step of determining a relative energy of background noise using a short-term average of the background noise comprises using a short-term average comprised of 512 audio data samples, each audio data sample having a length of approximately 0.064 seconds and sampling is performed at a sample rate of approximately 8 kHz.

4. The method for using a voice operated switch as recited in claim 1, wherein step of determining a relative energy of background noise using a long-term average comprises the summing of short-term averages for approximately 16 seconds.

5. The method for using a voice operated switch as recited in claim 1, wherein the step of determining a relative energy of background noise using a short-term difference of the background noise comprises determining a relative energy of background noise using a slope of the short-term averages which is representative of how fast the audio signal is changing.

6. The method for using a voice operated switch as recited in claim 1, wherein the steps of calculating a VOX threshold, calculating a voice threshold, and calculating a delta threshold are performed each time that the long-term average is calculated.

7. The method for using a voice operated switch as recited in claim 1, wherein the steps of calculating a VOX threshold, calculating a voice threshold, and calculating a delta threshold are only performed when a voice is not present in the audio signal.

8. The method for using a voice operated switch as recited in claim 1, wherein the step of comparing the VOX threshold to an amplitude of an incoming data sample comprises comparing a VOX threshold, which is a predetermined amount greater than the ambient noise, to the amplitude of the incoming data sample.

9. The method for using a voice operated switch as recited in claim 1, wherein the step of comparing the VOX threshold to an amplitude of an incoming data sample comprises comparing a VOX threshold which is a multiple of the long-term average to the incoming data sample.

10. The method for use a voice operated switch as recited in claim 1, where the step of comparing the VOX threshold to an amplitude of an incoming data sample comprises comparing a VOX threshold approximately equal to a maximum ambient noise amplitude to the incoming data sample.

11. The method for using a voice operated switch as recited in claim 1, wherein the delta threshold is approximately equal to the long-term average.

12. The method for using a voice operated switch as recited in claim 1, wherein the voice threshold is approximately 1.5 times the long-term average.

13. The method for using a voice operated switch as recited in claim 1, wherein the method is performed by an integer math processor and wherein:
    a) the VOX threshold is approximately equal to six times the long-term average;
    b) the voice threshold is approximately equal to the VOX threshold right-shifted by two bits; and
    c) the delta threshold is approximately equal to the long-term average right-shifted by one bit.

14. The method for using a voice operated switch as recited in claim 1, wherein:
    a) the long-term average is calculated by summing 256 short-term averages and right-shifting the sum of by eight bits; and
    b) the short-term average is calculated by summing the absolute value of 512 input samples and right-shifting the sum by nine bits.

15. The method for using a voice operated switch as recited in claim 1, wherein:
    a) the long-term average is calculated by summing 256 short-term averages which have been right-shifted by 4 bits prior to summing, then right shifting the final sum by four additional bits to prevent overflow in a 16-bit processor;
    b) the short-term average is calculated by summing the absolute value of 512 input samples which have been right-shifted by 5 bits prior to summing, then right shifting the final sum by four additional bits to prevent overflow in a 16-bit processor.

16. The method for using a voice operated switch as recited in claim 1, further comprising the step of initializing the VOX threshold, the voice threshold, and the delta threshold to the maximum allowed audio amplitude.

17. A method for using a voice operated switch in changing high noise environments, the method comprising the steps of:
    a) determining a relative energy of background noise by calculating a long-term average, a short-term average, and a short-term difference of the background noise, wherein:
        i) calculating the short-term average comprises summing an absolute value of a plurality of samples of audio data and applying a smoothing algorithm thereto;

ii) calculating the long-term average comprises summing a plurality of short-term averages; and iii) calculating the short-term difference comprises computing a difference between consecutive short-term averages;

b) calculating a VOX threshold;

c) calculating a voice threshold;

d) calculating a delta threshold;

e) comparing the VOX threshold to an amplitude of an incoming data sample;

f) when the amplitude of the incoming data sample is greater than the VOX threshold, then comparing the delta threshold to the short-term average delta; and, g) when the amplitude of at least one of the short-term average deltas is greater than the delta threshold within a preset period of time, then the incoming data sample is determined to be voice and the voice operated switch is actuated.

* * * * *